United States Patent
Toboso et al.

(10) Patent No.: US 7,959,108 B2
(45) Date of Patent: Jun. 14, 2011

(54) CONTROL DEVICE FOR LOCKING AND UNLOCKING AND AIRCRAFT DOOR AND AIRCRAFT DOOR THAT INTEGRATES SUCH A DEVICE

(75) Inventors: Alexandra Toboso, Seilh (FR); Christian Costecalde, Beauzelle (FR)

(73) Assignee: Airbus Operations SAS, Toulouse (FR)

( * ) Notice: Subject to any disclaimer, the term of this patent is extended or adjusted under 35 U.S.C. 154(b) by 586 days.

(21) Appl. No.: 11/996,974

(22) PCT Filed: Jul. 13, 2006

(86) PCT No.: PCT/FR2006/050716
§ 371 (c)(1),
(2), (4) Date: Apr. 2, 2008

(87) PCT Pub. No.: WO2007/012774
PCT Pub. Date: Feb. 1, 2007

(65) Prior Publication Data
US 2008/0210823 A1    Sep. 4, 2008

(30) Foreign Application Priority Data
Jul. 27, 2005    (FR) ...................................... 05 52336

(51) Int. Cl.
*B64C 1/14*    (2006.01)
(52) U.S. Cl. .......................... 244/129.5; 49/216; 49/218
(58) Field of Classification Search ............... 244/129.5; 292/100, 109, 110, 113, DIG. 31; 49/209, 49/211, 216, 218
See application file for complete search history.

(56) References Cited

U.S. PATENT DOCUMENTS

| | | | | | |
|---|---|---|---|---|---|
| 1,867,846 | A | * | 7/1932 | Keeler | 292/113 |
| 2,813,712 | A | * | 11/1957 | Stanis | 267/257 |
| 3,791,073 | A | | 2/1974 | Baker | |
| 4,365,831 | A | | 12/1982 | Bourne | |
| 4,693,503 | A | * | 9/1987 | Bisbing | 292/210 |
| 5,031,863 | A | | 7/1991 | Noble | |
| 5,823,473 | A | * | 10/1998 | Odell et al. | 244/129.5 |
| 6,343,815 | B1 | | 2/2002 | Poe | |
| 6,834,834 | B2 | | 12/2004 | Dazet et al. | |
| 2002/0096602 | A1 | | 7/2002 | Dazet et al. | |

FOREIGN PATENT DOCUMENTS

| | | |
|---|---|---|
| FR | 2 819 782 | 7/2002 |
| WO | 00/76841 A1 | 12/2000 |

* cited by examiner

*Primary Examiner* — Tien Dinh
*Assistant Examiner* — Michael Kreiner
(74) *Attorney, Agent, or Firm* — Young & Thompson

(57) ABSTRACT

A control device for locking and unlocking a door includes a handle (46) whose movement makes it possible to control the change of state of the locking or unlocking of the door, a hinged flap (54) that can move between a closed position and an open position in which it makes it possible to grip the handle, elements for locking and unlocking the handle that are able to occupy two states, a first locked state in which the handle is immobilized and a second unlocked state in which the handle can be maneuvered, and a stop (64) that makes it possible to control the movement of the hinged flap (54), during the change of state of the locking and unlocking elements, wherein the stop is elastically deformable so as to be able to be deformed by the hinged flap during the change of state of the locking and unlocking elements.

20 Claims, 4 Drawing Sheets

CONTROL DEVICE FOR LOCKING AND UNLOCKING AND AIRCRAFT DOOR AND AIRCRAFT DOOR THAT INTEGRATES SUCH A DEVICE

BACKGROUND OF THE INVENTION

1. Field of the Invention

This invention relates to a control device for locking and unlocking an aircraft door as well as an aircraft door that integrates such a device.

2. Description of the Related Art

For the rest of the description, door is defined as all the devices, such as a flap, hatch or the like, comprising a panel that can block an opening in a wall in a first position and can release it in another position regardless of the shapes, the dimensions, and the function.

An aircraft door comprises, on the one hand, a door frame that is connected to the fuselage of the aircraft, delimiting an opening, and, on the other hand, a flap that is articulated relative to the door frame, able to occupy a first so-called closed position in which it blocks the opening, and another position in which it releases the opening.

Various means can be provided to allow the articulation of the flap relative to the door frame, in particular those that are described in the document FR-2,819,782. These means of articulation are such that they make it possible for the outside surface of the flap of the aircraft to be flush with the outside shell of the fuselage to limit the disruption of the air flows around said fuselage when the flap is in closed position.

In addition, the aircraft door comprises means for locking and unlocking to keep the flap in closed position. If appropriate, these means for locking and unlocking can come in the form of bolts or locks that are provided at the flap and that each are able, in the locked state, to work with a housing or catch that is provided at the door frame. According to another embodiment, the means for locking and unlocking the door comprise stops that are placed on the periphery of the flap and that are able, in the locked state, to rest against stops that are provided at the door frame, whereby the flap is able to move to pass from the locked state to the unlocked state so that the stops of the flap no longer work with the stops of the door frame.

Control devices are generally provided on both sides of the door to ensure the change of state of the means for locking and unlocking the door.

This invention relates more particularly to the control device for locking and unlocking the door that is provided outside of the aircraft, generally called outside handle.

The movement of the handle by an operator thus brings about the change of state of the means for locking and unlocking. If appropriate, the handle can be connected directly or indirectly, by means of connecting rods, for example, to the means for locking and unlocking the door.

Figure 1:
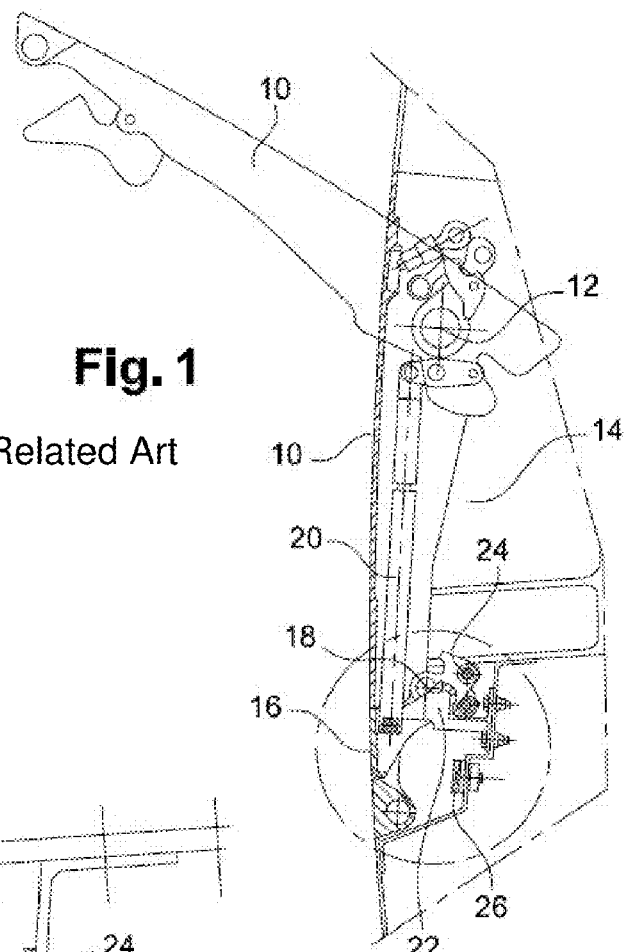
Figure 2:
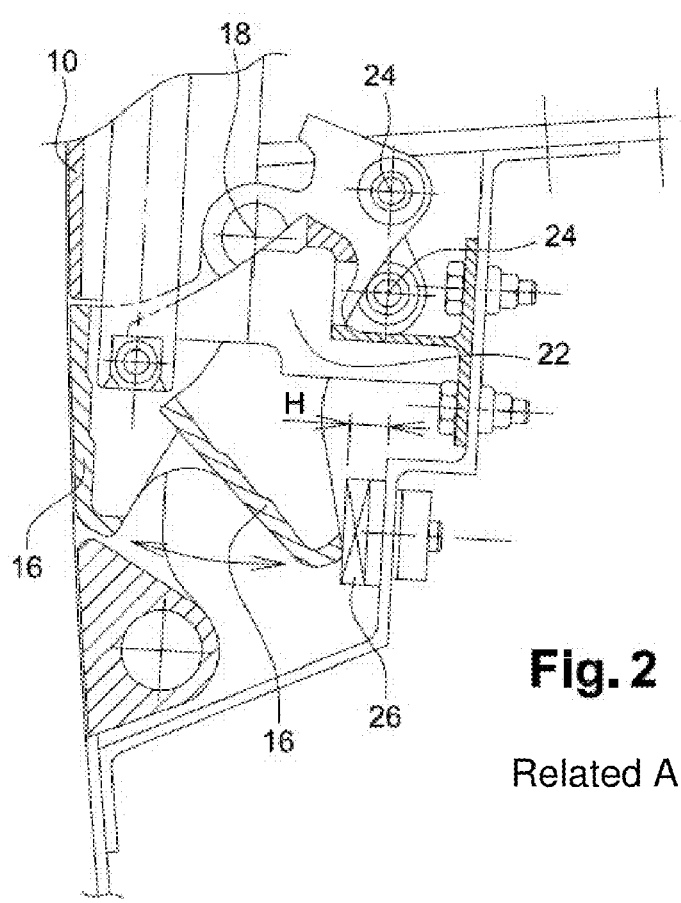

In FIGS. 1 and 2, a handle is shown in rest position, in heavy lines, corresponding to the locked state of the means for locking and unlocking the door, and in raised position, in broken lines, corresponding to the unlocked state of the means for locking and unlocking the door.

This handle comprises a body 10 that can pivot around a pivoting axis 12, placed in the plane of the door, whereby the body is able to be placed, in rest position, in a housing 14. The shapes and the dimensions of the handle are adjusted to those of the housing so that the handle blocks the housing in rest position so as to reduce the disruption of the air flows around the shell of the fuselage.

Also, to be able to grasp the handle, the control device comprises a hinged flap 16 that is placed, as appropriate, at the body of the handle or on the periphery. This hinged flap 16 is articulated to be able to occupy two positions, a first so-called closed position in which it ensures the continuity of the shell of the aircraft so as to reduce the disruption of the air flows, and another open position in which it allows the handle to be gripped. As illustrated in FIG. 2, the hinged flap can pivot around a shaft 18 that is integral with the handle, placed in the plane of said handle. According to another variant, as illustrated in the document U.S. Pat. No. 4,365,831, the hinged flap can be articulated relative to the housing and not relative to the handle.

Advantageously, the hinged flap 16 comprises return means 20 to tend to keep the hinged flap in the closed position.

According to another function of the hinged flap, the latter can also keep the handle in rest position. For this purpose, the control device comprises means for locking and unlocking the handle that can occupy two states, a first locked state in which the handle is immobilized in rest position, and another unlocked state in which the handle can be maneuvered, in particular up to the raised position.

According to a variant that is illustrated by FIG. 2, the means for locking and unlocking the handle comprise, on the one hand, at least one hook 22 that is integral with the housing 14 (kinematically connected to the flap), and, on the other hand, at least one locking shaft 24 that is integral with the hinged flap 16 that is able to be held by the hook 22 in the locked state. According to another variant, the hook can be integral with the hinged flap and the locking shaft that is connected to the housing.

A rigid stop 26 is provided at the housing to limit the travel of the hinged flap, in particular during the transition between the locked state and the unlocked state. This rigid stop 26 generally comprises a stack of blocks to adjust its height H at a rate in particular of the dimensional fluctuations of the hook, the hinged flap and/or the relative position between the hook and the hinged flap. Thus, the height H should be adjusted for each hinged flap. This adjustment operation generates an additional cost, based on the adjustment time. This adjustment time is all the longer since said adjustment has to be made in a painstaking manner.

Thus, if the height H of the stop is too high, the hinged flap cannot pivot enough and the locking shaft cannot come to be immobilized in the hook, and the handle returns to locked position, which can be reflected by a sudden and violent closing of the hinged flap on the fingers of the operator who is closing the door. On the contrary, if the height H of the stop is too low, it is not possible to control the position of the hinged flap, which can be reflected by immobilization of the aircraft on the ground.

SUMMARY OF THE INVENTION

Also, this invention aims at overcoming the drawbacks of the prior art by proposing a control device for locking and unlocking a door of an aircraft ensuring a reliable operation and making it possible to reduce the assembly costs.

For this purpose, the invention has as its object a control device for locking and unlocking a door or the like, comprising a handle whose movement makes it possible to control the change of state of the locking or unlocking of said door, a hinged flap that can move between a closed position and an open position in which it makes it possible to grip said handle, means for locking and unlocking said handle that are able to occupy two states, a first locked state in which the handle is immobilized and a second so-called unlocked state in which the handle can be maneuvered, as well as a stop that makes it possible to control the movement of the hinged flap, in particular during the change of state of the means for locking and unlocking the handle, characterized in that the stop can be deformed elastically so as to be able to be deformed by the hinged flap during the change of state of the means for locking and unlocking the handle.

This arrangement makes it possible to avoid the adjustment of the height of the stop during the assembly, which contributes to reducing the assembly costs. Furthermore, whereby the stop is deformable, it makes possible—regardless of its height—the change of state of the means for locking and unlocking the handle, which contributes to making the device more reliable.

BRIEF DESCRIPTION OF THE DRAWING FIGURES

Figure 3:
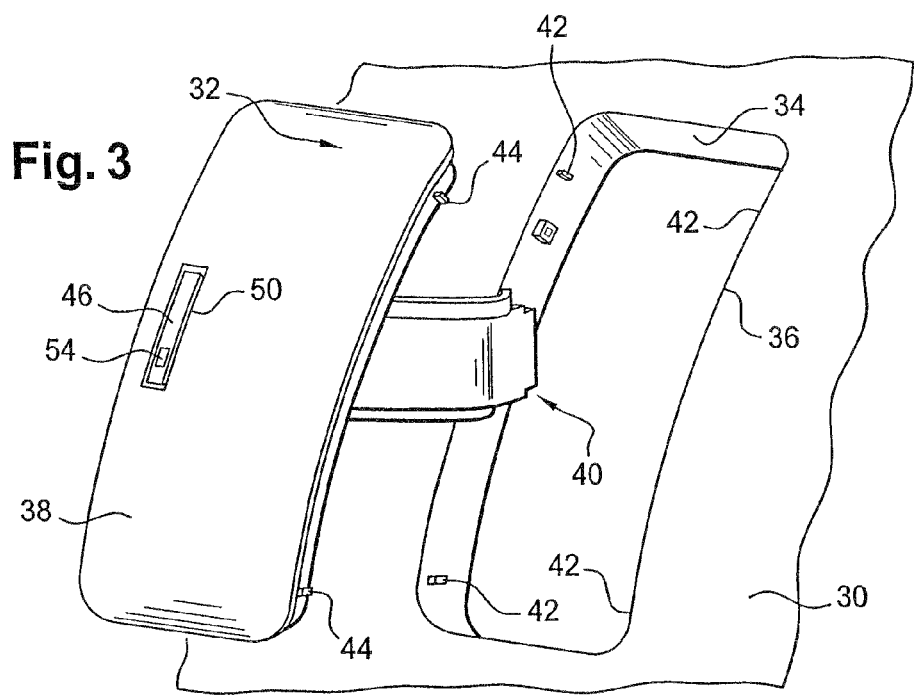
Figures 4A, 4B:
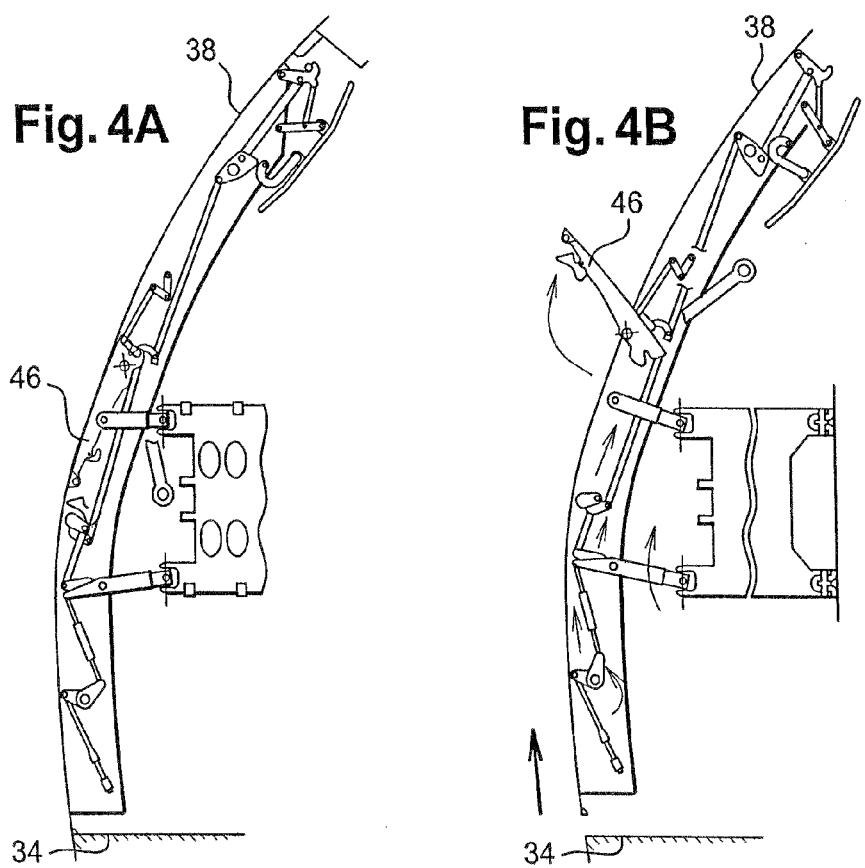
Figure 5:
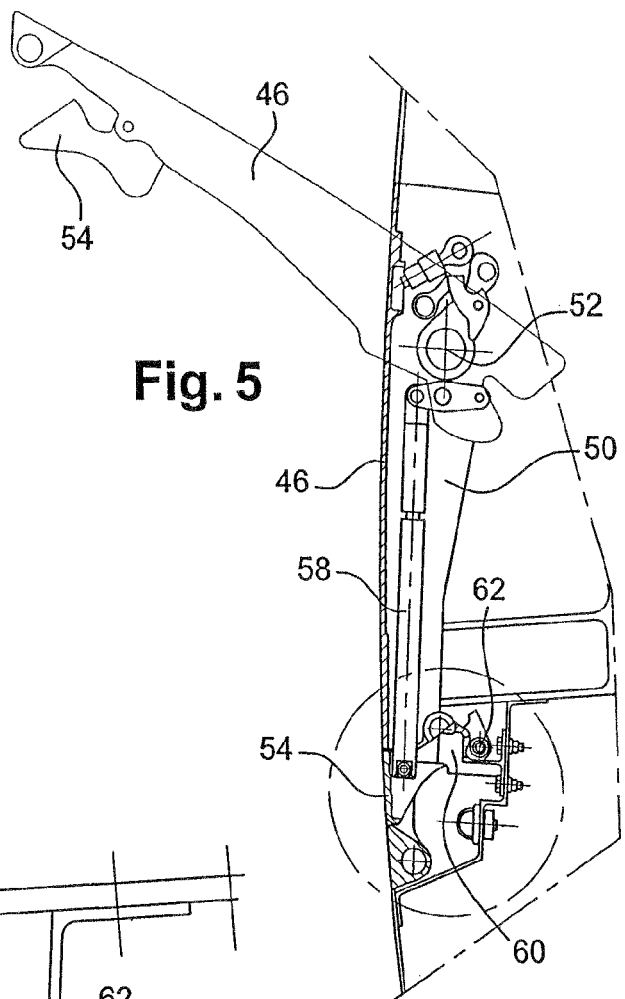
Figure 6:
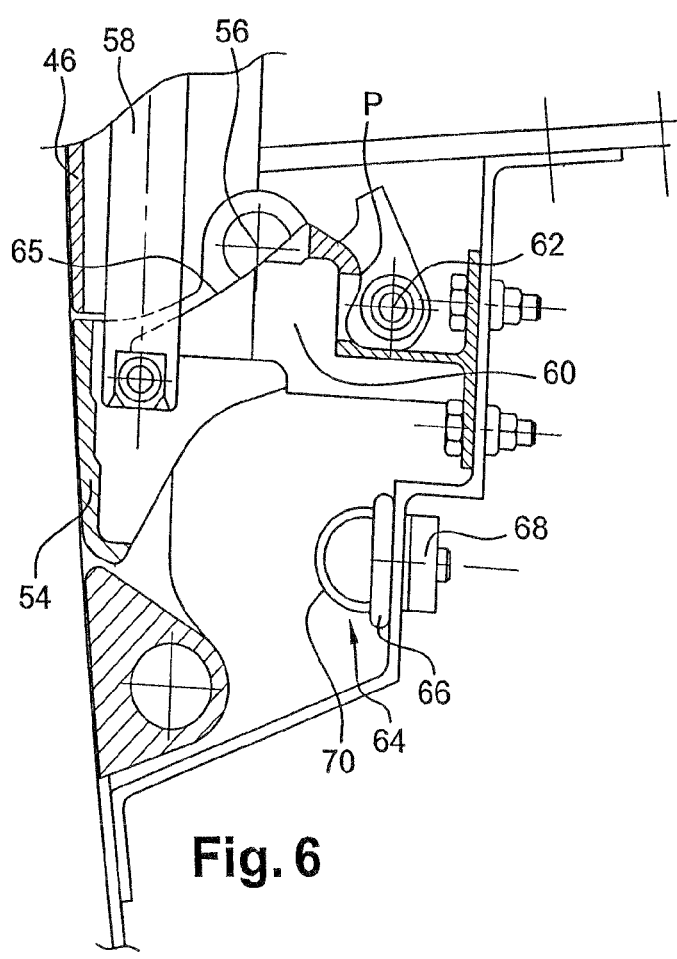
Figure 9:
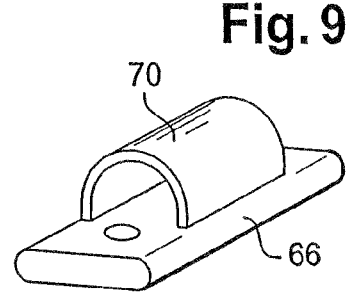
Figure 7:
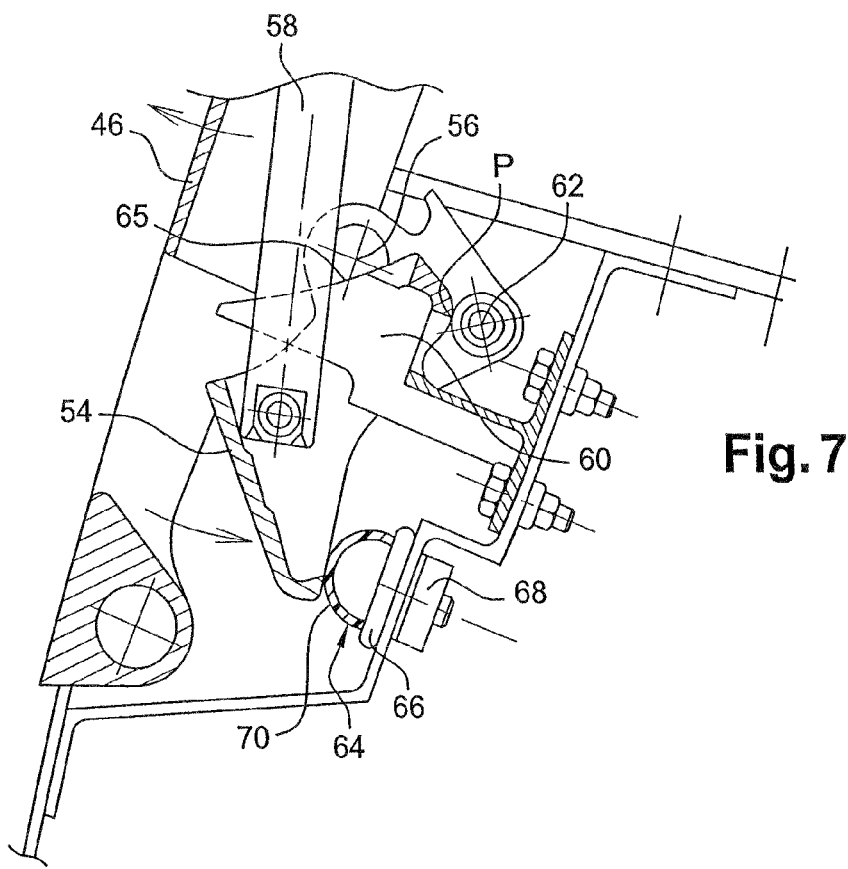
Figure 8:
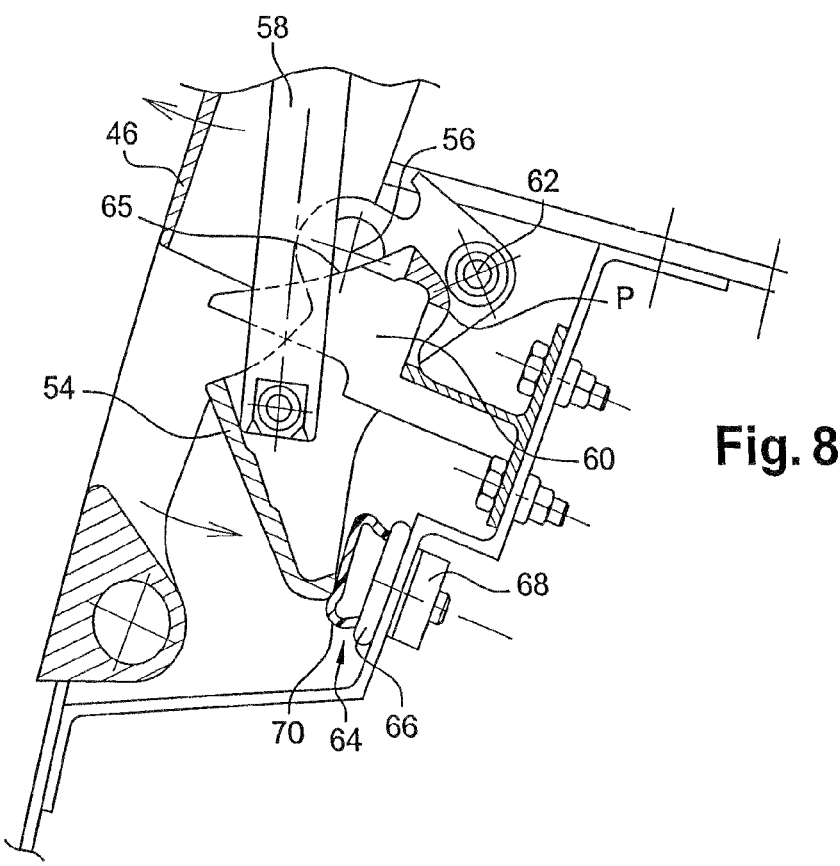

Other characteristics and advantages will emerge from the following description of the invention, a description that is provided only by way of example, taking into account the accompanying drawings in which:

FIG. 1 is a view that illustrates a control device for locking and unlocking an aircraft door according to the prior art, FIG. 2 is a sectional drawing that illustrates in detail a hinged flap and a stop of the control device for locking and unlocking an aircraft door of FIG. 1, FIG. 3 is a perspective view that illustrates an aircraft door, FIGS. 4A and 4B are views that illustrate respectively the door in locked position and in unlocked position, FIG. 5 is a view that illustrates a control device for locking and unlocking an aircraft door according to the invention, FIG. 6 is a sectional drawing that illustrates in detail a hinged flap and a stop of the control device for locking and unlocking an aircraft door of FIG. 5 in the locked state, FIGS. 7 and 8 are sectional drawings that illustrate in detail a hinged flap and a stop of the control device for locking and unlocking an aircraft door of FIG. 5 at different times of the change of state between the locked state and the unlocked state, and FIG. 9 is a perspective view of a stop according to an embodiment.

DETAILED DESCRIPTION OF THE INVENTION

In FIG. 3, an aircraft fuselage that comprises a door 32, provided in particular for the entry and exit of individuals inside the aircraft, is shown at 30.

As indicated in the introductory clause, door is defined as any panel that can block an opening in one position and release it in another, regardless of the dimensions, the shapes or the function.

In a known manner, the door 32 comprises, on the one hand, a door frame 34 that is connected to the fuselage 30 of the aircraft, delimiting an opening 36, and, on the other hand, a flap 38 that is articulated relative to the door frame 34, able to occupy a first so-called closed position in which it blocks the opening 36 and another position in which it releases the opening 36. Articulation means 40 are provided between the door frame 34 and the flap 38 to ensure the movement of the latter between the closed and open positions. Various solutions and kinematics can be considered for the articulation means 40, in particular the one that is described in the document FR-2,819,782. The articulation means 40 are not presented in more detail because they are known to one skilled in the art.

In addition, the aircraft door 32 comprises means for locking and unlocking to keep the flap 38 in closed position. According to an embodiment, the means for locking and unlocking the door comprise, on the one hand, stops 42 that are integral with the door frame, and, on the other hand, stops 44 that are placed on the periphery of the flap 38 that are able, in the locked state, to rest against the stops 42 of the door frame, whereby the pressure inside the aircraft tends to push the flap toward the outside of the aircraft.

The means for locking and unlocking the door can take other forms and can come in, for example, the form of bolts. Also, the means for locking and unlocking the door are not presented in more detail because they are within the scope of one skilled in the art.

At least one control device is provided at the door to ensure the change of state of the means for locking and unlocking the door. In general, one control device is provided on the inside of the aircraft and another is provided on the outside in the form of a handle 46. The control device that is provided on the inside is not presented in more detail because it is known to one skilled in the art.

As illustrated in FIGS. 4A and 4B, the handle is able to be maneuvered by an operator, whereby the movement of said handle 46 causes, by means of connecting rods or the like, the change of state of the means for locking and unlocking the door. According to the embodiment illustrated in FIG. 4B, when an operator raises the handle 46, this movement causes a slight raising of the door. As a result, the stops of the flap are no longer placed to the right of the stops of the door frame, making possible the movement of opening said flap relative to the door frame.

According to the variants, the handle may or may not be connected directly to the means for locking and unlocking the door. The connection between the handle 46 and the means for locking and unlocking the door is not presented in more detail because it is within the scope of one skilled in the art.

As illustrated in FIGS. 5 to 8, the outside handle comprises a body 48 that allows an operator to grip it, whereby said body is articulated relative to a housing 50 that is provided at the outside surface of the flap 38. According to a preferred embodiment, the body can pivot around a pivoting axis 52, placed in the plane of the door, kinematically connected to the housing 50, whereby said handle is able to pivot between a so-called rest position in which the handle is placed in the housing and another raised position as illustrated in broken lines in FIG. 5. The shape and the dimensions of the handle are adapted to those of the housing so that the handle in rest position does not project relative to the shell of the aircraft and does not disrupt the air flows around the aircraft.

To be able to grasp the body of the handle, a hinged flap 54 is provided at the body of the handle or on the periphery of the handle. This hinged flap 54 is articulated to be able to occupy two positions: a first so-called closed position in which it ensures the continuity of the shell of the aircraft so as to reduce the disruption of the air flows, and another open position in which it allows the gripping of the handle 46. Thus, in the closed position, the outside surface of the handle 46 and the outside surface of the hinged flap 54 are essentially coplanar.

According to an embodiment that is illustrated by FIGS. 5 to 8, the hinged flap 54 can pivot around a shaft 56 that is integral with the handle 46. However, other technical solutions can be considered. Thus, the hinged flap can pivot around a shaft that is integral with the housing 50, as illustrated in the document U.S. Pat. No. 4,365,831.

Advantageously, the hinged flap 54 comprises return means 58, for example a return connecting rod, to tend to keep the hinged flap in the closed position.

According to another characteristic, the handle 46 comprises means for locking and unlocking that can occupy two states, a first locked state in which the handle is immobilized in rest position, and another unlocked state in which the handle can be maneuvered, in particular to the raised position.

According to an embodiment, these means for locking and unlocking the handle comprise, on the one hand, at least one hook 60 that is integral with the housing 50 (kinematically connected to the flap), and, on the other hand, at least one locking shaft 62 that is integral with the hinged flap 46, which can be held by the hook 60 in the locked state.

As a variant, the hook 60 can be connected to the handle 46, and the locking shaft 62 can be connected to the housing.

According to another embodiment, the hinged flap 54 can be placed in the extension of the handle 46 and can be articulated relative to the housing 50. In this case, the means for locking and unlocking consist of cooperating shapes of the ends of the hinged flap and the handle that are placed end to end, as illustrated in, for example, the document U.S. Pat. No. 4,365,831.

The transition from the locked state to the unlocked state or vice versa is called hard point P. At this moment, according to the example that is illustrated by FIGS. 7 and 8, the locking shaft 62 is released by the hook 60 during the transition to the unlocking state. During the locking, after the transition from the hard point, the locking shaft 62 is held by the hook 60.

Advantageously, the handle 46 comprises return means that tend to raise it slightly when the means for locking and unlocking are in the unlocked state, to facilitate its gripping.

The control device also comprises a stop 64 for controlling the movement of the hinged flap 54, in particular during the transition from the hard point P.

According to the invention, the stop 64 can be deformed elastically so as to be able to be lightly crushed by the hinged flap 54 during the transition from the hard point P, as illustrated in FIG. 8. In addition, the stop 64 tends to exert force on the hinged flap 54 so as to create an obstacle to the opening of said hinged flap 54 and to keep the locking shaft 62 against the hook 60 during the transition from the hard point P.

The stop 64 that is elastically deformable makes it possible to ensure a reliable operation of the handle 46. Actually, even if the height H of the handle is too high, said stop can be crushed so as to allow the hinged flap 54 to pivot enough to allow the change of state of the means for locking and unlocking the handle and to make it possible for the locking shaft 62 to pass the hard point P.

Furthermore, whereby the stop 64 is identical for all the aircraft and does not require any adjustment, it makes it possible to reduce the assembly costs.

According to another advantage that is obtained by the stop 64 that is elastically deformable, the travel of the hinged flap is limited, which makes it possible to prevent a sudden and violent closing of the hinged flap 54 on the fingers of the operator who closes the door.

Finally, the stop 64 that is elastically deformable makes it possible to indicate to the operator who is manipulating the handle 46 the imminent transition from the hard point P and the change of state of the means for locking and unlocking. Thus, when the hinged flap comes into contact against the stop 64, the locking shaft 62 is still held by the hook 60 during the unlocking phase, as illustrated in FIG. 7.

During the closing of the door, the locking shaft 62 is guided by the ramp 65 of the hook 60; this causes the hinged flap 54 to pivot. When the latter comes into contact against the stop 64, the locking shaft 62 has not always gotten beyond the hard point P and is not always held by the hook. By continuing the closing movement, the stop 64 tends to be crushed until the locking shaft 62 gets beyond the hard point P. After this transition, the locking shaft 62 is held by the hook, and the hinged flap pivots so as to return to the closed position.

According to one embodiment, the stop 64 that is elastically deformable is made of elastomer. As illustrated in FIG. 9, according to an embodiment, the stop comprises a rectangular base 66 with a deformable, elastomer cylinder portion 70 at one of the faces, whereby orifices are provided at the base for means 68 of attachment to a frame, in particular to the housing 50. The axis of the cylinder 70 is advantageously oriented approximately parallel to the edge of the hinged flap that is able to come into contact against the stop. According to an embodiment, the force that is exerted by the stop 64 against the hinged flap 54 is proportional to the crushing of the stop. However, a function of the force exerted by the non-linear stop could be considered.

Of course, the invention obviously is not limited to the embodiment that is shown and described above but on the contrary covers all the variants, in particular regarding the shapes, the dimensions, and the material of the stop that is elastically deformable, the means for locking and unlocking the handle, and the means for locking and unlocking the door.

Finally, the invention may be applied to different types of doors, hatches or the like, provided on different types of devices.

The invention claimed is:

1. A control device for locking and unlocking a door, comprising:
   a handle (46) whose movement makes it possible to control the change of state of the locking or unlocking of said door;
   a hinged flap (54) that can move between a closed position and an open position in which it makes it possible to grip said handle (46);
   means for locking and unlocking said handle (46) that are able to occupy two states, a first locked state in which the handle is immobilized and a second unlocked state in which the handle can be maneuvered; and
   a stop (64) that makes it possible to control the movement of the hinged flap (54) during a change of state of the means for locking and unlocking the handle (46), the stop (64) being elastically deformable so as to be able to be deformed by the hinged flap (54) during the change of state of the means for locking and unlocking the handle (46), and the stop (64) comprises a base (66) with a deformable elastomer cylinder portion (70) at one face of the base (66), said cylinder portion (70) being hollow and an axis of the cylinder portion (70) being oriented approximately parallel to an edge of the hinged flap (54).

2. The control device for locking and unlocking a door according to claim 1, wherein the hinged flap (54) can pivot around a shaft (56) that is integral with the handle (46).

3. The control device for locking and unlocking a door according to claim 2, wherein the stop (64) that is elastically deformable is made of elastomer.

4. The control device for locking and unlocking a door according to claim 2, wherein the base (66) is a rectangular base (66).

5. The control device for locking and unlocking a door according to claim 1, wherein the stop (64) that is elastically deformable is made of elastomer.

6. The control device for locking and unlocking a door according to claim 5, wherein the base (66) is a rectangular base (66).

7. The control device for locking and unlocking a door according to claim 1, wherein the base (66) is a rectangular base (66).

8. The control device for locking and unlocking a door according to claim 1, wherein the means for locking and unlocking said handle (46) comprise stops (42) that are integral with the door frame, and stops (44) that are placed on a periphery of a flap (38) that are able in the locked state to rest against the stops (42) of the door frame.

9. An aircraft door that integrates a control device for locking and unlocking said door, said control device comprising:
- a handle (46) whose movement makes it possible to control the change of state of the locking or unlocking of said door;
- a hinged flap (54) that can move between a closed position and an open position in which it makes it possible to grip said handle (46);
- means for locking and unlocking said handle (46) that are able to occupy two states, a first locked state in which the handle is immobilized and a second unlocked state in which the handle can be maneuvered; and
- a stop (64) that makes it possible to control the movement of the hinged flap (54) during a change of state of the means for locking and unlocking the handle (46), the stop (64) being elastically deformable so as to be able to be deformed by the hinged flap (54) during the change of state of the means for locking and unlocking the handle (46), and the stop (64) comprises a base (66) with a deformable elastomer cylinder portion (70) at one face of the base (66), said cylinder portion (70) being hollow and an axis of the cylinder portion (70) being oriented approximately parallel to an edge of the hinged flap (54).

10. The aircraft door according to claim 9, wherein the hinged flap (54) can pivot around a shaft (56) that is integral with the handle (46).

11. The aircraft door according to claim 10, wherein the stop (64) that is elastically deformable is made of elastomer.

12. The aircraft door according to claim 10, wherein the base (66) is a rectangular base (66).

13. Aircraft door according to claim 9, wherein the stop (64) that is elastically deformable is made of elastomer.

14. The aircraft door according to claim 13, wherein the base (66) is a rectangular base (66).

15. The aircraft door according to claim 9, wherein the base is a rectangular base (66).

16. A control device for locking and unlocking a door, comprising:
- a handle (46) whose movement makes it possible to control the change of state of the locking or unlocking of said door;
- a hinged flap (54) that can move between a closed position and an open position in which it makes it possible to grip said handle (46);
- a handle lock configured to occupy two states, a first locked state in which the handle is immobilized and a second unlocked state in which the handle can be maneuvered; and
- a stop (64) that makes it possible to control the movement of the hinged flap (54) during a change of state of the handle lock, the stop (64) being elastically deformable so as to be able to be deformed by the hinged flap (54) during the change of state of the handle lock, and the stop (64) comprises a base (66) with a deformable elastomer cylinder portion (70) at one face of the base (66), said cylinder portion (70) being hollow and an axis of the cylinder portion (70) being oriented approximately parallel to an edge of the hinged flap (54).

17. The control device for locking and unlocking a door according to claim 16, wherein the handle lock comprises stops (42) that are integral with the door frame, and stops (44) that are placed on a periphery of a flap (38) that are able in the locked state to rest against the stops (42) of the door frame.

18. The control device for locking and unlocking a door according to claim 16, wherein the hinged flap (54) can pivot around a shaft (56) that is integral with the handle (46).

19. The control device for locking and unlocking a door according to claim 16, wherein the stop (64) that is elastically deformable is made of elastomer.

20. The control device for locking and unlocking a door according to claim 16, wherein the base (66) is a rectangular base (66).

* * * * *